United States Patent [19]

Ono

[11] Patent Number: 4,723,620

[45] Date of Patent: Feb. 9, 1988

[54] MOTORCYCLE FRAME AND SWING ARM SUPPORT STRUCTURE

[75] Inventor: Keizi Ono, Saitama, Japan

[73] Assignee: Honda Giken Kogyo Kabushiki Kaisha, Tokyo, Japan

[21] Appl. No.: 890,349

[22] Filed: Jul. 25, 1986

[30] Foreign Application Priority Data

Jul. 25, 1985 [JP] Japan ................... 60-162943

[51] Int. Cl.⁴ .............. B62K 25/16; B62K 25/20
[52] U.S. Cl. .................... 180/219; 280/275; 280/284
[58] Field of Search .......... 180/219, 227, 218; 280/274, 275, 276, 277, 279, 281 R, 285, 286

[56] References Cited

U.S. PATENT DOCUMENTS

| 4,265,329 | 5/1981 | Cortanze | 280/275 |
| 4,388,978 | 6/1983 | Fior | 280/283 |
| 4,526,249 | 7/1985 | Parker | 180/219 |

FOREIGN PATENT DOCUMENTS

| 142739 | 5/1978 | Japan | 180/219 |
| 126723 | 8/1982 | Japan | 180/219 |

Primary Examiner—John J. Love
Assistant Examiner—Everett G. Diederiks, Jr.
Attorney, Agent, or Firm—Lyon & Lyon

[57] ABSTRACT

A motorcycle structure including a power unit having a transversely mounted engine with side covers of the crankcase extending forwardly of the power unit to provide mounting points for a swing arm front suspension assembly. Pivot shafts extend between the mounting points on the side covers to receive a first end of the front swing arms. Also a cushion member extends from one of the pivot shafts to a progressive linkage on the front swing arm suspension. A rear swing arm is similarly mounted between transmission side cover plates. The front cushion member is displaced laterally from the centerline of the vehicle while exhaust pipes are displaced laterally in the opposite direction to define a compact design.

6 Claims, 4 Drawing Figures

MOTORCYCLE FRAME AND SWING ARM SUPPORT STRUCTURE

BACKGROUND OF THE INVENTION

The field of the present invention is the structural and suspension architecture of motorcycles.

Conventional motorcycles comprise a separate frame structure including head pipes, main pipes, down tubes and the like. Such a frame is the basic structure for the motorcycle for supporting the power unit, the front suspension and the rear suspension, among other things. The frame receives reaction forces from the front and rear wheels and serves to suspend the body of the motorcycle and the mechanisms mounted thereon. The requirements for such a frame are, therefore, substantial and the frame is typically a heavy component of the vehicle.

Motorcycles have been developed which eliminate the heavy frame. One such motorcycle is illustrated in Japanese Patent Publication No. 58-49435. The motorcycle of that publication employs connecting plates fixed to a power unit. A front swing arm assembly is then mounted to the mounting plates. The assembly in turn supports a front wheel. In a similar manner, a rear fork assembly is pivotally mounted by plates also fixed to the engine and in turn mounting a rear wheel. In this mechanism, the engine serves as the body frame for sustaining static and dynamic loads of the front and rear suspension assemblies. Such vehicles are found to be of reduced weight and lowered center of gravity. Another vehicle also understood to eliminate at least portions of the frame is illustrated in Japanese Patent Publication No. 53-142739.

With the foregoing vehicles, the shape and strength of the power unit becomes important for considerations other than proper power unit design. The additional mounting brackets also contribute weight to the overall vehicle.

SUMMARY OF THE INVENTION

The present invention is directed to the structural and suspension layout of a motorcycle. Components inherent to the power unit are employed for purposes of mounting the front suspension assembly. To this end, right and left cranckcase side covers are configured to accommodate the mounting points for the front suspension. In this way, the side covers may be independently configured to operate in their normal function and, in addition, provide the necessary mounting points. The employment of side covers for mounting also further reduces the weight of such a vehicle.

In further aspects of the present invention, the front mounting is provided by two mounting shafts extending between the side covers. These mounting shafts provide mounting points for the front swing arms as well as one end of the cushion assembly. The arrangement of the cushion may also be coordinated with that of the exhaust pipes to provide a compact design.

DETAILED DESCRIPTION OF THE PREFERRED EMBODIMENT

Figure 1:
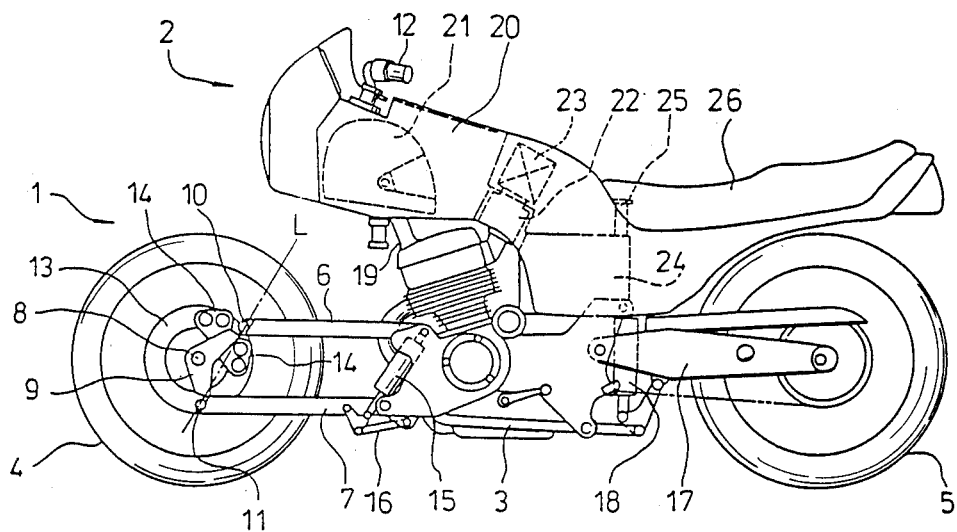
FIG. 1 is a side view of a motorcycle employing the present invention.

A motorcycle is composed of a body structure 1 having an upper structure 2 and a power unit 3. The body structure 1 supports a front wheel 4 and a rear wheel 5 via front and rear suspension systems. The front portion of the power unit 3 pivotally supports a front swing arm assembly including upper swing arm 6 and lower swing arm 7 such that they may move in vertical planes. An arm member 9 is supported by means of ball joints 10 and 11 to the forward ends of the swing arms 6 and 7. The front wheel 4 is rotatably supported on an axle 8 attached to the arm member 9. The arm member 9 is connected by means of steering linkage to a steering handle 12. The geometry is such that the steering handle 12 controls pivotal movement of the front wheel 4 around the axis L connecting the ball joints 10 and 11 for steering of the vehicle. Since the swing arms 6 and 7 form a parallel link mechanism, the inclination of the steering line L is always kept constant. Both swing arms 6 and 7 extend along one side of the wheel and turn inwardly to meet the arm member 9, as can best be seen in the plan view of FIG. 3. The wheel is thus supported in a cantilever fashion along the fore-and-aft center plane of the vehicle.

The front wheel 4 has a brake disc 13 and the front swing arm assembly includes two brake calipers 14. A cushion member 15 is employed for damping vertical movement of the front swing arm assembly. The cushion member 15 has an upper end mounted to the power unit 3 and a lower end coupled with the lower swing arm 7 by means of a progressive link mechanism 16.

The rear wheel 5 is supported by a rear fork 17 which is pivotally supported by the power unit 3. A rear cushion unit 18, similar to the cushion unit 15 of the front swing arm assembly, is mounted between the power unit 3 and the rear fork 17.

Figure 2:
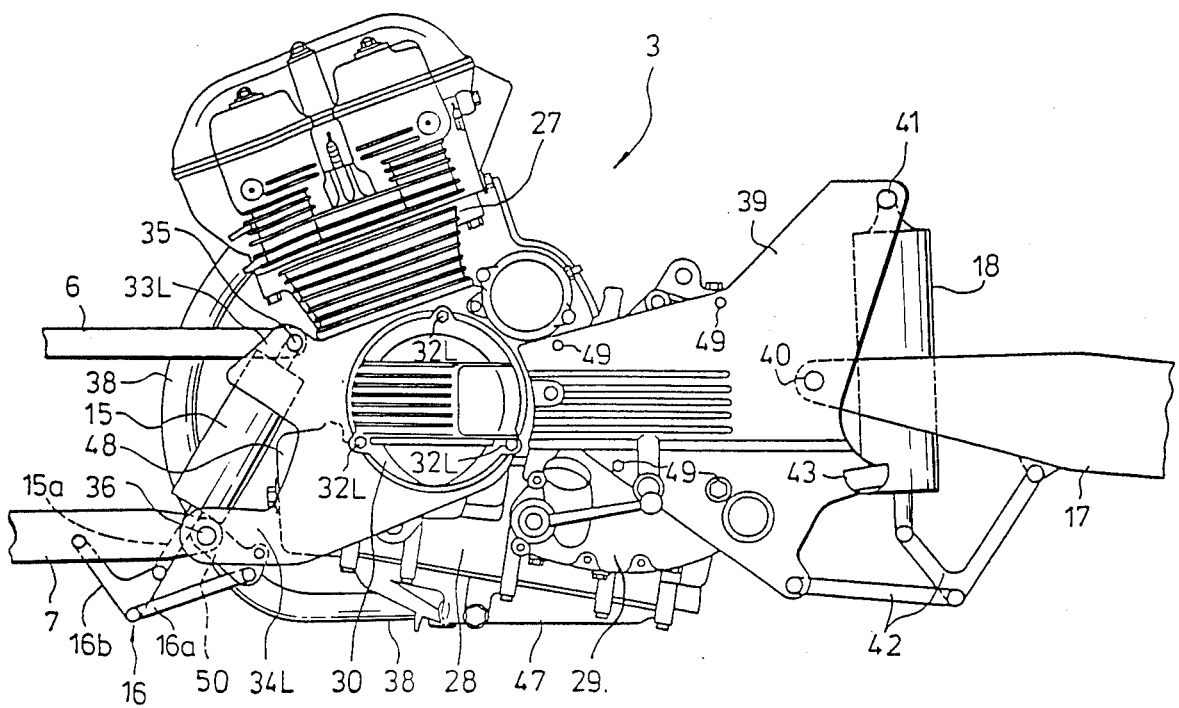
FIG. 2 is a side view in greater detail of an engine employing the present invention.
Figure 3:
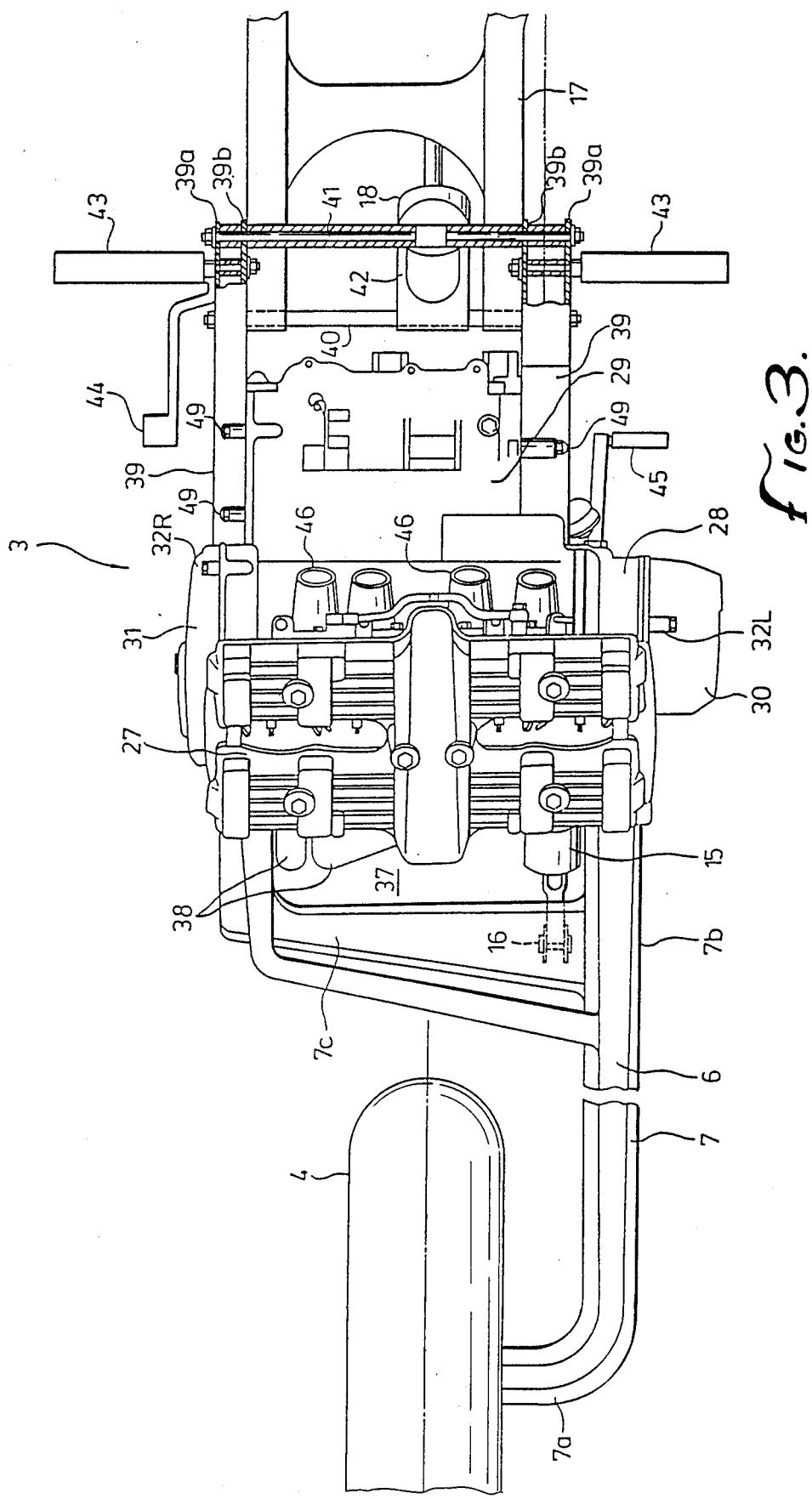
FIG. 3 is a plan view of the engine and suspension assemblies of the vehicle of FIG. 1.
Figure 4:
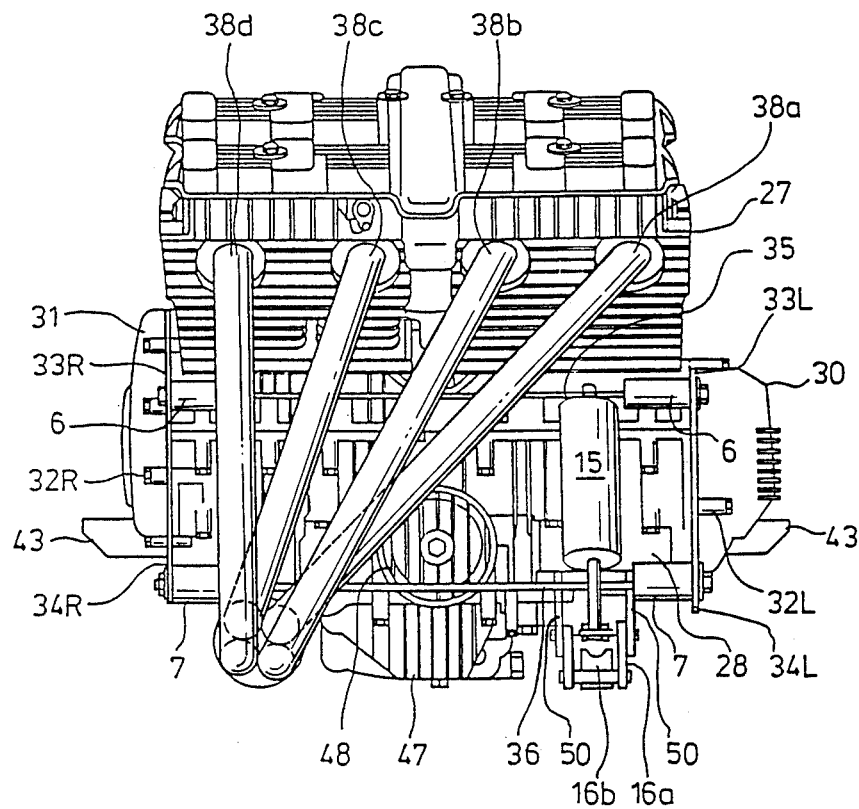
FIG. 4 is a front view of the engine of FIG. 1.

The upper body structure 2 is supported by the power unit 3 by means of bracket members 19. The steering handle 12 is rotatably mounted onto this upper body structure 2. Since the upper structure 2 does not require traditional main pipes and other frame members, the front part of the structure may be used as a container which can contain, for instance, a helmet 21 or other things. Provided in the rear of the container 20 is a and an air cleaner 23 for the engine. A fuel tank 24 is supported by the power unit 3 at the rear of the engine cylinders and above the transmission case of the power unit. This arrangement makes it possible to employ a relatively large fuel tank and, at the same time, lower the center of gravity of the motorcycle. A fuel inlet 25 is also shown as is a seat 26 associated with the upper body. FIGS. 2 through 4 provide additional detail to the structural layout of the system. The power unit 3 is shown to include a four-cylinder inline type engine whose crankshaft extends laterally of the vehicle. The power unit 3 includes the cylinder block 27, a crankcase 28 and the transmission case 29. The crankcase 28 consists of upper and lower cases and an oil pan 47. An oil filter 48 is also shown. Left and right crankcase side covers 30 and 31 are arranged on opposite ends of the laterally extending crankcase. These case covers 30 and 31 are solidly fixed to the sides of the crankcase 28 by means of bolts 32L and 32R as in more conventional engine designs. In this embodiment, the case covers 30 and 31 further have upper and lower arms 33L, 34L, 33R and 34R which each project forwardly of the power unit.

An upper pivot shaft 35 extends between the upper arms 33L and 33R and is securely fixed thereto. A rear end of the upper swing arm 6 is forked to extend to and be mounted on the upper pivot shaft 35 at either end thereof. Similarly, the lower pivot shaft 36 extends between the lower arms 34L and 34R and is secured thereto. The lower swing arm 7 is also forked and extends to either end of the lower pivot shaft 36. Thus, the swing arms 6 and 7 are pivotally supported by the power unit 3 by means of the crankcase side covers 30 and 31. Alternatively either of the mounting shafts 35 or 36 may comprise separate shafts not extending from cover, to cover but separately mounting the ends of the forked portion to the respective adjacent cover.

With the foregoing arrangement, the power unit 3 need not have both crankcase side covers and brackets fixed thereto for mounting the swing arms. Further, the location of the mounting for the swing arms can be easily changed through the simple process of changing the shapes of the crankcase side covers 30 and 31 without changing other components of the power unit. The pivot shafts 35 and 36 and the ball joints 10 and 11 form a parallelogram when viewed from the side, such as in FIG. 1. Thus, during the swinging of the swing arms 6 and 7, the steering line L is retained at a constant inclination. This keeps the castor angle of the front wheel 4 always constant.

Looking in greater detail to the structure of the swing arms, the lower swing arm 7 extends directly forwardly from a pivot position on the left side of the lower pivot shaft 36. The front end portion 7a is bent toward the centerline C of the motorcycle body. The front end portion 7a supports the front wheel 4 in cantilever fashion along the centerline C. The lower swing arm 7 has a back portion which is forked. One portion of the fork 7b extends in line with the main body of the swing arm 7 to the left side of the lower pivot shaft 36. The other portion 7c of the swing arm branches off from the main body of the lower swing arm 7 and extends behind the front wheel 4 in a lateral manner and then extends rearwardly along the right side of the vehicle to the right end of the lower pivot shaft 36. Thus, the lower swing arm 7 has an h-form when viewed from above. Thus, there is a broad base for support of the lower swing arm 7 at portions 7b and 7c to either side of the lower pivot shaft 36. A space 37 is defined in front of the power unit 3 by the portions 7b and 7c of the lower swing arm 7 and by the forward extent of the power unit itself. The upper swing arm 6 is similarly configured as can be seen in FIG. 3.

Connected to the cylinder block 27 on the front side thereof are exhaust pipes 38a, 38b, 38c and 38d. These exhaust pipes 38 are arranged in the space 37 and are gathered together at a lower, right position in front of the power unit 3 to then extend rearwardly below the engine. The foregoing arrangement of the exhaust pipes 38 leaves an open space on the left side of the portion 37 for the cushion member 15.

The cushion member 15 may be a usual shock absorbing unit consisting of a piston, a cylinder and springs. The cushion member 15 has an upper end pivotally mounted to the crankcase side covers 30 and 31 by means of the upper pivot shaft 35. The lower end of the cushion member 15 is mounted to the lower swing arm 7 by means of progressive mounting linkage 16. Thus, the movement of the front wheel 4 is damped while the suspension force of the front wheel supports the vehicle.

The progressive mounting linkage 16 consists of a link member 16a pivotally connected to the arm 34L by means of a bracket 50. A link member 16b is pivotally connected to the other end of the link member 16a and to the lower swing arm 7. Connected to the middle portion of the link member 16b is a piston rod 15a of the cushion member 15. In this way, the link mechanism 16 provides a progressive shock absorbing action.

Fixed on the transmission case 29 on both sides with bolts 49 are right and left transmission case covers 39. Each transmission case cover 39 is in the form of a box having an outer wall 39a and an inner wall 39b as shown in FIG. 3. These transmission case covers 39 extend rearwardly from the transmission case 29. The extended portions thereof receive a rear pivot shaft 40 which is secured thereto. The rear pivot shaft 40 in turn supports the front ends of an H-shaped rear swing arm 17 which supports the rear wheel 5. Mounted between the transmission case covers 39 and the rear fork 17 is a rear cushion member 18 similar to that of the cushion member 15. The rear cushion member 18 has an upper end pivotally supported by a support shaft 41 connecting the transmission case covers 39 and a lower end connected to the rear swing arm 17 by means of a progressive mounting linkage similar to that of the progressive mounting linkage 16. The right and left transmission case covers 39 also mount steps 43 which project laterally therefrom. The steps 43 are fixed through both the outer and inner walls 39a and 39b of each transmission case coupled with nuts to retain them in place. The rear pivot shafts 40 are similarly attached. Further attached is a brake pedal 44. Also noted in FIG. 3 are a gear change pedal 45 and intake tubes 46 associated with a carburetor.

Thus, an improved arrangement for a motorcycle employing components of the engine as major frame structure is disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A motorcycle comprising:
   a front wheel and a rear wheel longitudinally spaced along the central axis of said motorcycle;
   a power unit intermediate said front wheel and said rear wheel including a crankcase extending transversely of said central axis;
   crankcase covers closing, and being rixedly connected to, the longitudinal ends of said crankcase, said crankcase covers being each integrally formed with a pair of vertically spaced extension arms extending forwardly of said power unit;
   mounting shafts mounted on said extension arms;
   a front swing arm assembly including a pair of vertically spaced, substantially parallel swing arms having means at one end for rotably mounting said front wheel and means at the other end for pivotally connecting each of said swing arms to the respective of said mounting shafts; and
   a front cushion member having one end thereof pivotally connecting one of said mounting shafts and the other end connecting one of said swing arms.

2. The motorcycle according to claim 1 in which each of said crankcase covers include a cup-shaped portion enclosing the end of said crankcase and an integrally formed flange portion containing said extension arms surrounding said cup-shaped portion; and means in said flange portion for threadedly connecting said covers to said crankcase.

3. The motorcycle according to claim 1 in which said power unit includes a cylinder block substantially coextensive with said crankcase; a plurality of exhaust pipes connecting with a forward portion of said cylinder block and extending downwardly and rearwardly therefrom; said swing arms being bifurcated at said other ends to define a space to accommodate passage of said exhaust pipes rearwardly of said power unit.

4. The motorcycle according to claim 3 in which said cushion member is disposed on one lateral side of said central axis and said exhaust pipes converge to the other lateral side of said central axis.

5. The motorcycle according to claim 1 in which said front cushion member is connected to the lower of said swing arms through a progressive mounting linkage.

6. The motorcycle according to claim 1 in which said power unit includes a transmission case parallel to, and rearwardly spaced from, said crankcase; transmission case covers closing the longitudinal ends of said transmission case; extension arms extending rearwardly from each of said transmission case covers; mounting shafts mounted in said transmission case extension arms; and a rear swing arm having one end rotably mounting said rear wheel and the other end pivotally connecting said mounting shafts.

* * * * *